(12) United States Patent
Nakar et al.

(10) Patent No.: US 12,289,292 B2
(45) Date of Patent: Apr. 29, 2025

(54) ATTACK CATEGORIZATION BASED ON MACHINE LEARNING FEATURE CONTRIBUTION

(71) Applicant: IMPERVA, INC., San Mateo, CA (US)

(72) Inventors: Ori Nakar, Givat Shemuel (IL); Nadav Avital, Pardes Hana (IL); Aiah Lerner, Ramat Gan (IL)

(73) Assignee: Imperva, Inc., San Mateo, CA (US)

( * ) Notice: Subject to any disclaimer, the term of this patent is extended or adjusted under 35 U.S.C. 154(b) by 87 days.

(21) Appl. No.: 17/522,310

(22) Filed: Nov. 9, 2021

(65) Prior Publication Data

US 2023/0144836 A1    May 11, 2023

(51) Int. Cl.
*H04L 9/40* (2022.01)
(52) U.S. Cl.
CPC ........ *H04L 63/0245* (2013.01); *H04L 63/145* (2013.01); *H04L 63/168* (2013.01)
(58) Field of Classification Search
CPC . H04L 63/0245; H04L 63/145; H04L 63/168; H04L 9/40
See application file for complete search history.

(56) References Cited

U.S. PATENT DOCUMENTS

| | | | |
|---|---|---|---|
| 10,454,967 B1* | 10/2019 | Zaslavsky | H04L 63/1441 |
| 10,523,609 B1* | 12/2019 | Subramanian | H04L 51/08 |
| 11,997,131 B1* | 5/2024 | Sirianni | G06N 3/04 |
| 2010/0199345 A1* | 8/2010 | Nadir | H04L 63/14 726/22 |
| 2019/0188212 A1* | 6/2019 | Miller | H04L 63/145 |
| 2020/0067969 A1* | 2/2020 | Abbaszadeh | G06N 20/10 |
| 2023/0114719 A1* | 4/2023 | Thomas | H04L 63/1441 726/22 |

FOREIGN PATENT DOCUMENTS

| | | | | |
|---|---|---|---|---|
| CN | 111144549 A | * | 5/2020 | G06K 9/6256 |
| CN | 111224942 B | * | 11/2021 | H04L 63/145 |

* cited by examiner

*Primary Examiner* — Jayesh M Jhaveri

(57) ABSTRACT

According to some embodiments of the disclosure, a method includes receiving an electronic communication directed to a data resource, determining, by a machine learning (ML) web application firewall (WAF), an attack probability of the electronic communication based on a plurality of features, wherein subsets of the plurality of features are arranged in a plurality of feature groups, adjusting the attack probability based on respective feature weights of the plurality of feature groups.

20 Claims, 9 Drawing Sheets

300

| Feature | Request 1 | Request 2 | Request 3 |
|---|---|---|---|
| request contains "exe" | TRUE | FALSE | FALSE |
| request contains "python" | FALSE | FALSE | FALSE |
| request contains "nmap" | FALSE | FALSE | FALSE |
| request contains "java" | FALSE | FALSE | FALSE |
| request contains "chr(" | FALSE | FALSE | FALSE |
| request contains "//.." | TRUE | FALSE | FALSE |
| request contains "=utf" | FALSE | FALSE | FALSE |
| request contains "d=&c" | FALSE | FALSE | FALSE |
| request contains "/**/" | FALSE | TRUE | TRUE |
| client is python | TRUE | TRUE | TRUE |
| client is chrome | FALSE | FALSE | FALSE |
| client is sqlmap | FALSE | FALSE | FALSE |
| number of '/' in URL | 0 | 5 | 5 |

| Feature | Request 1 | Request 2 | Request 3 |
|---|---|---|---|
| request contains "exe" | 0 | 0 | 0 |
| request contains "python" | 0 | 0 | -0.1 |
| request contains "nmap" | 0 | 0 | 0 |
| request contains "java" | 0 | 0 | 0 |
| request contains "chr(" | 0 | 0 | 0 |
| request contains "//.." | 0.1 | 0 | 0 |
| request contains "=utf" | 0 | 0.2 | 0 |
| request contains "d=&c" | 0 | 0 | 0 |
| request contains "/**/" | 0 | 0 | 0 |
| client is python | 0 | 0 | 0 |
| client is chrome | 0 | 0 | 0 |
| client is sqlmap | 0 | 0 | 0 |
| number of '/' in URL | 0 | 0.1 | 0 |

FIG. 3B

ATTACK CATEGORIZATION BASED ON MACHINE LEARNING FEATURE CONTRIBUTION

TECHNICAL FIELD

Aspects of the present disclosure relate to networks that store data and execute web applications, and more particularly, to providing enhanced security for data and web applications in a network.

BACKGROUND

A data center may include database servers and other devices on which data is stored and on which web applications may execute. A data center may implement a data repository, which may refer to any appropriate storage system such as an object storage system (e.g., an AMAZON S3® system), a database, a filesystem, and a cloud storage layer, for example. Because a data center may be accessed remotely (e.g., via the internet), it may be subject to attacks such as hacking attempts, malicious activity carried out by bots, scraping, and distributed denial of service (DDoS) attacks, among others. Thus, data centers may use third party security platforms that provide application and data security by protecting against such attacks. Many security platforms utilize a web application firewall (WAF) which may be deployed on premises or in the cloud (e.g., deployed across a globally distributed content distribution network (CDN)). For example, a WAF may be positioned at a CDN's edge and may intercept all incoming application traffic before it is sent to servers within the CDN.

One functionality of the WAF may include protecting web applications at the application layer of the underlying network (e.g., at layer 7 of the open systems interconnection (OSI) model) by filtering, monitoring, and blocking malicious requests (e.g., requests provided by Hypertext Transfer Protocol (HTTP) or secure Hypertext Transfer Protocol (HTTPS)) traveling to the web applications. The WAF may also prevent unauthorized data from leaving the web applications. The WAF may act as an intermediary that protects web application servers from a potentially malicious client. A WAF may inspect requests at the connection level, the request format and structure level, and the content level.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIGS. 3A and 3B are tables illustrating a set of example feature vectors and example contribution values, respectively, in accordance with some embodiments of the present disclosure.

DETAILED DESCRIPTION

Figure 1A:
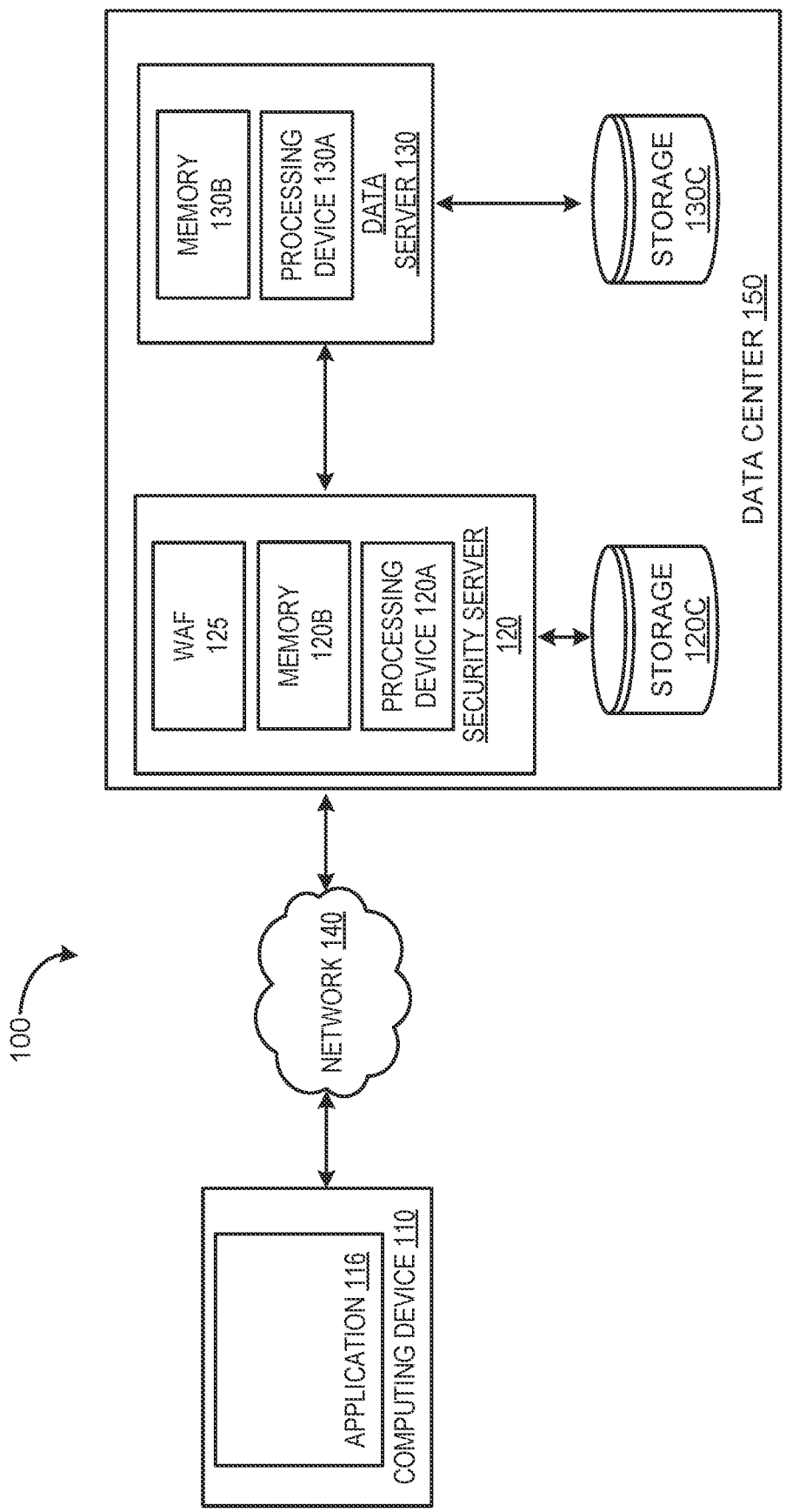
FIGS. 1A and 1B are block diagrams that illustrate example systems, in accordance with some embodiments of the present disclosure.

A WAF may be implemented in a number of ways. For example, a rule-based WAF may detect network attacks by adhering to a set of rules that help determine what traffic is malicious and what traffic is safe. The set of rules may be created and managed by security experts. Rule-based WAFs generally protect against specific attack vectors and may indicate an attack when a particular network communication matches one of the rules associated with a specific attack vector. The rules in a rule-based WAF may be static. As a result, the rules, and thus the protection offered, may become obsolete over time.

In addition, WAFs may be implemented using machine learning (ML) based techniques. These ML WAFs (also referred to herein as ML-based WAFs) may function more generically, and may detect attacks based on features of a network communication, such as a content request. For example, an ML WAF may be trained to detect attacks based on request features such as remote command execution (RCE) keywords, N-grams, a client from which the request originated, and a location from which the request originated, among others. Because ML WAFs do not rely on pre-defined rules, they can detect attacks even when the attack vector is not specifically known. The ML-based WAF may have the benefit of dynamically adjusting to new attacks, as feature vectors of the attacks are recognized and the protection automatically adjusted.

In a rule-based WAF the rules that were triggered to detect an attack may be evident. However, in the ML-based WAF, the detection of attack may instead be an attack probability rather than a specific rule that has been violated. For example, the ML-based WAF may provide an attack probability for a given communication request as a number between 0 and 1 (e.g., with a higher number indicating a higher likelihood that the incoming traffic is an attack). The model used by the ML-based WAF may be based on hundreds of features, and unlike security rules, each feature may not specifically define the attack. Features of a network communication (e.g., a content request from the CDN) can be, for example, the length of the URL, the number of parameters, and/or a search for keywords in a header. For example, a length of a URL in a content request may exceed 128 characters. This length may be identified with the ML-based WAF as a feature that may tend to increase a probability that the associated network communication is an attack, but is not, standing alone, necessarily a conclusive indication. Instead, the length of the URL may be taken into account along with other features of the network communication that increase, or decrease, that attack probability of the network communication. This can be contrasted with a rule-based approach in which every URL having a length greater than 128 characters is marked as an attack.

Relying on rules may make a rule-based WAF accurate and easy to understand. For example, a security analyst who added a rule to a rule-based WAF typically knows the vulnerability at which the rule was targeted. The ML-based WAF has its own advantages. For example, the use of feature analysis by the ML-based WAF may allow for the ML-based WAF to be much more general. As a result, the ML-based WAF may detect attacks that security analysts are not yet aware of and, thus, have not yet provided rules to address. In addition, the ML-based WAF can save expensive manual work associated with adding rules. However, the ML model is more generic and may not necessarily be focused on specific vulnerabilities. In addition, the data that is used to create the ML model may be collected from many different sources, therefore making the model general and not specific to a certain environment.

As noted above, an ML-based WAF may output an attack probability, which may be a number without any additional explanation. The calculated probability may be based on input from a large number of features used to train the ML model. The high number of features may make it difficult to know which factors affected the attack probability. While in a rule-based WAF, the rule that was triggered may provide an explanation of the underlying cause of an indicated attack, this functionality is difficult in an ML-based WAF due to the lack of reliance on rules and the high number (e.g., hundreds) of contributing features that may otherwise be meaningless without a specific context. This difficulty may further complicate efforts to customize the ML-based WAF and respond to growing threats, as the underlying details of the attack may be difficult to ascertain.

The present disclosure addresses the above-noted and other deficiencies by using a processing device to categorize an attack probability generated by an ML-based WAF. For example, the ML-based WAF may receive an electronic communication (e.g., a network communication) and associate the electronic communication with an attack probability. The attack probability may be based on a plurality of features, each of which is associated with a particular contribution to the attack probability. The features may be grouped into a number of feature groups, and the contributions of the individual features of the feature groups may be combined (e.g., summed) to provide an overall contribution of the feature groups to the attack probability.

The use of feature groups may provide a number of benefits. For example, the smaller number of feature groups (as compared to the features) may provide a more easily understood grouping of a much larger number of features. As a non-limiting example, a single feature group for "remote command execution" may contain tens or hundreds of features that are associated, either directly or peripherally, with remote command execution vulnerabilities. For attack explanation purposes, the ability to group these features into a single feature group may make it easier to understand to what extent the contribution of a "remote command execution" vulnerability played in the overall attack probability.

Moreover, the use of feature groups may make administration of the ML-based WAF easier. For example, as will be discussed further herein, weights may be applied to various ones of the feature groups that allow for the relative importance of one or more of the feature groups to play a larger (or smaller) role in the determination of the attack probability. This group-based administration may be much more efficient than administration of each of the hundreds of individual features. Thus, the use of feature groups may provide a technical improvement to the administration of ML-based WAFs.

Figure 1B:
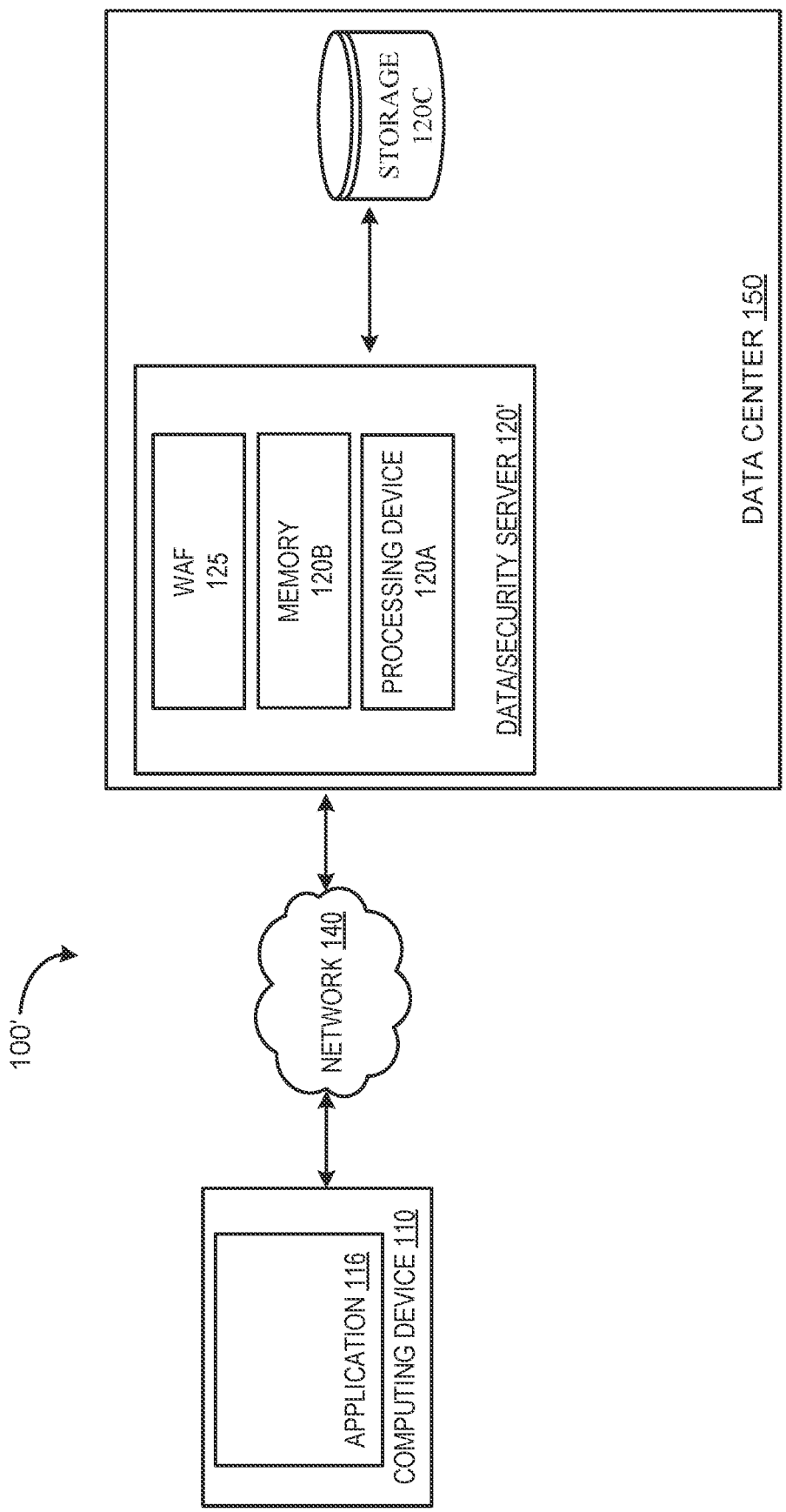

FIGS. 1A and 1B are block diagrams that illustrate example systems 100, 100', in accordance with some embodiments of the present disclosure. Referring to FIG. 1A, an example system 100 includes computing device 110 and a data center 150 comprising a data server 130 and a security server 120. Though a single security server 120 and a single data server 130 are illustrated in FIG. 1A, it will be understood that this is for illustrative purposes and not intended to limit the scope of the disclosure.

The computing device 110 and the data center 150 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WIFI® hotspot connected with the network 140 and/or a wireless carrier system that can be implemented using various data processing equipment, communication towers (e.g. cell towers), etc. The network 140 may carry communications (e.g., data, message, packets, frames, etc.) between computing device 110 and the data server 130 of the data center 150. The computing device 110, data server 130, and the security server 120 may each include hardware such as a processing device, a memory, storage devices, and other hardware devices (e.g., sound card, video card, etc.).

For example, the security server 120 may include processing device 120A and the data server 130 may include processing device 130A. The processing devices 120A, 130A may include, for example, one or more general-purpose processing devices such as a microprocessor, central processing unit, or the like. More particularly, the processing devices 120A, 130A may be complex instruction set computing (CISC) microprocessors, reduced instruction set computer (RISC) microprocessors, very long instruction word (VLIW) microprocessors, or processors implementing other instruction sets, or processors implementing a combination of instruction sets. Processing devices 120A, 130A may also be one or more special-purpose processing devices such as an application specific integrated circuit (ASIC), a field programmable gate array (FPGA), a digital signal processor (DSP), network processor, or the like.

The security server 120 may include memory 120B and the data server 130 may include memory 130B. The memory 120B may include a volatile memory such as dynamic random access memory (DRAM), synchronous DRAM (SDRAM), double data rate SDRAM (DDR SDRAM), low power DDR SDRAM (LPDDR SDRAM), static random access memory (SRAM), etc. or a nonvolatile memory such as ferroelectric RAM (FRAM), resistive RAM (ReRAM), spin-transfer torque RAM (STT-RAM), etc.

The security server 120 may include storage 120C and the data server 130 may include storage device 130C. The storage devices 120C, 130C may include, for example, hard-disk drives (HDD) and solid-state drives (SSD). The storage devices 120C, 130C may comprise a persistent storage that is capable of storing data. The persistent storage may be a local storage unit or a remote storage unit. The persistent storage may be a magnetic storage unit, optical storage unit, solid state storage unit, electronic storage units (main memory), or similar storage unit. Persistent storage may also be a monolithic/single device or a distributed set of devices. The storage 120C of the security server 120 may be used for storing data and executing security applications (such as the WAF 125 to be described further herein) and may include, for example, ML models associated with the security server 120. The storage device 130C of the data server 130 may be used for storing data and executing web applications (not shown).

The computing device 110, data server 130, and the security server 120 may each comprise any suitable type of computing device or machine that has a programmable processor including, for example, server computers, desktop computers, laptop computers, tablet computers, smartphones, set-top boxes, etc. In some examples, the computing device 110, data server 130, and the security server 120 may each comprise a single machine or may include multiple interconnected machines (e.g., multiple servers configured in a cluster). The computing device 110, data server 130, and the security server 120 may be implemented by a common entity/organization or may be implemented by different entities/organizations. For example, computing device 110 may be operated by a first company/corporation and data server 130 and security server 120 may be operated by a second company/corporation. The computing device 110, data server 130, and the security server 120 may each execute or include an operating system (OS). The OSs of computing device 110, data server 130, and the security server 120 may manage the execution of other components (e.g., software, applications, etc.) and/or may manage access to the hardware (e.g., processors, memory, storage devices etc.) of the computing device 110, data server 130, and the security server 120, respectively.

As illustrated in FIG. 1A, computing device 110 may run an application 116 which may allow a user to interact with data center 150. When the user wants to access the data center 150, they may utilize application 116 (which may be e.g., a client w/a graphical user interface (GUI)) to connect to a specific data server 130 of the data center 150 via the security server 120. The application 116 may interact with the security server 120 which may execute a WAF 125 that may analyze requests by the application 116 to access the data server 130 to determine if they are malicious/constitute an attack. The WAF 125 may be a software module stored in memory 120B and executed by processing device 120A, may be logic/firmware implemented directly on processing device 120A, or may comprise separate/dedicated hardware within the security server 120. Although illustrated in an on-premises configuration in FIG. 1A, the WAF 125 may be implemented in any appropriate configuration including deployment in a CDN, for example.

Though FIG. 1A illustrates a data center 150 in which the security server 120 and the data server 130 are separate devices, the embodiments of the present disclosure are not limited to such a configuration. FIG. 1B illustrates a system 100' in which the functions of the security server and data server are combined in a data/security server 120'. The data/security server 120' may include processing device 120A, memory 120B, and storage 120C.

As illustrated in FIG. 1B, computing device 110 may run an application 116 which may connect to data/security server 120' of the data center 150. The data/security server 120' may execute a WAF 125 that may analyze requests by the application 116 to access the storage 120C of the data/security server 120' to determine if the requests are malicious/constitute an attack. The WAF 125 may be a software module stored in memory 120B and executed by processing device 120A, may be logic/firmware implemented directly on processing device 120A, or may comprise separate/dedicated hardware within the data/security server 120'.

Figure 2:
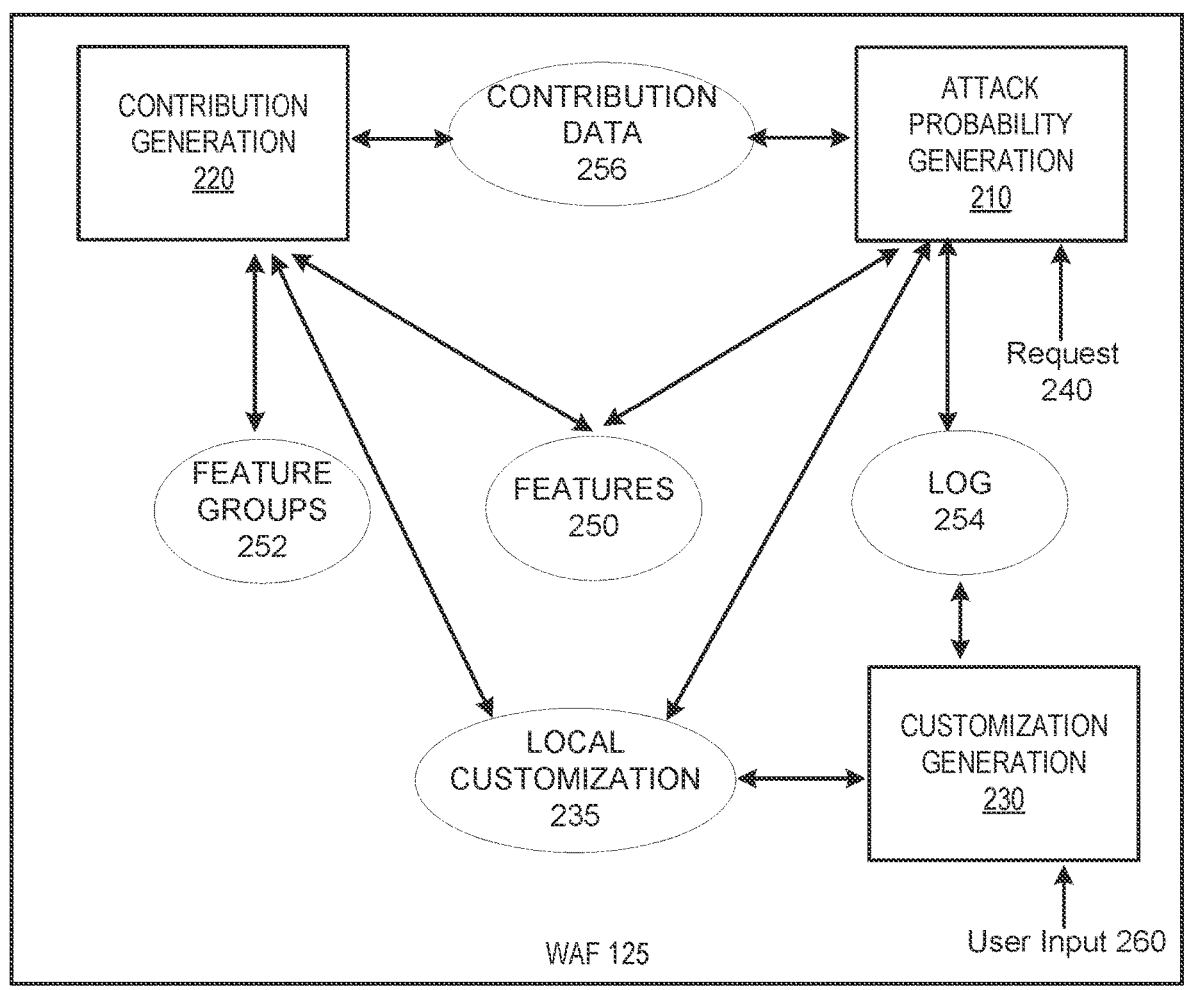
FIG. 2 is a block diagram of an example WAF, in accordance with some embodiments of the present disclosure.

FIG. 2 is a block diagram of an example WAF 125, in accordance with some embodiments of the present disclosure. The WAF 125 may be an ML-based WAF 125 that incorporates a machine learning algorithm to provide a component that is trained to identify malicious requests based on features 250 of an incoming request 240. Examples of the machine learning algorithm may include, but are not limited to, neural network, decision tree, generic algorithm (GA), genetic programming (GP), Gaussian process regression, Linear Discriminant Analysis, K-nearest Neighbor (K-NN), Perceptron, Radial Basis Function Network, Support Vector Machine (SVM), and deep-learning.

The WAF 125 and/or the machine learning algorithm thereof may be trained using training data comprising previous requests that have each been broken into their component features 250 (also referred to herein as a feature set), where each request of the training data has been annotated to indicate whether it corresponded to an attack. During training, the WAF 125 may learn to identify those features 250 (or combinations of features 250) that are indicative of an attack and which can be used to make predictions about requests. Non-limiting examples of features in a request include RCE keywords (e.g., ".exe," "python," "nmap," "chr(," and "java"), N-grams (e.g., query string 4-grams such as "// . . . ", "=UTF", "d=&c", "/**/"), a client from which the request originated (e.g., Python, Chrome, SQL-Map), a number of "/" characters in the URL of the request (e.g., 1, 2, 3), a location from which the request originated, a length of the URL of the request, a distribution of the time intervals of the request, the sizes of HTTP objects within the request, and/or the distribution of HTTP status codes within the request, among others. Upon completion of the training, the WAF 125 may analyze features 250 of incoming requests 240 and make predictions about whether they correspond to an attack. For example, N-grams are keywords (of size N) which are popular in attacks and rare in clean traffic. They are determined periodically based on recent attacks and recent clean traffic, and may be used by the WAF 125 to identify attacks. The dynamic nature of the WAF 125 may allow it to detect attacks that involve various combinations of these features 250.

In some embodiments, the WAF 125 may generate an attack probability in response to request 240 utilizing an attack probability generation component 210. In some embodiments, mitigation actions can then be initiated on the basis of the generated attack probability. For example, the WAF 125 (e.g., as executed by processing device 120A in FIGS. 1A and 1B) may terminate a session or temporarily block a source IP of a request 240 if the attack probability generation component 210 indicates that there is a high probability that the request 240 is an attack. In addition, the WAF 125 may only initiate other actions such as e.g., displaying a "Completely Automated Public Turing test to tell Computers and Humans Apart" (CAPTCHA) test (or other similar bot detection application) if the WAF 125 determines that there is a high probability that a request 240 has been automated, for example by a bot if the indicated probability of a request 240 being an attack is not sufficiently high (e.g., the level of uncertainty is too high), the WAF 125 may also log the request details in log 254 and/or send them to a peripheral system, such as a fraud detection system, which may then conduct an initial analysis and may assist in making a decision. In some embodiments, the attack probability generation component 210 may output an attack probability as a number between 0 and 1 where a 0 indicates that there is no chance the request is an attack and a 1 indicates that there is a 100% chance that the request is an attack. It will be understood that other formats and ranges for the attack probability are possible, without deviating from the scope of the present disclosure.

The WAF 125 may also assign to each feature 250 of the request 240 an indication of its contribution to the attack probability (also referred to herein as the feature contribution or contribution data 256), which may be a number between −1 and 1. The feature contribution 256 may be an indication as to how much a given feature 250 contributed to the attack probability. A positive feature contribution 256 may indicate that a given feature 250 tends to indicate that the request 240 is an attack, while a negative feature contribution 256 may indicate that a given feature 250 tends to indicate that the request 240 is not an attack.

FIGS. 3A and 3B are tables illustrating a set of example vectors 300 of features 250 and an example set 350 of contribution data 256, respectively, in accordance with some embodiments of the present disclosure. In response to receiving a set of requests, the attack probability generation component 210 (e.g., as executed by processing device 120A of FIGS. 1A and 1B) may analyze each request 240 and break each request 240 into a set of features 250. The features 250 may describe particular characteristics of the request 240. The attack probability generation component 210 may encode the set of features 250 of each request 240 to Boolean columns in a feature vector, as shown in FIG. 3A illustrating a set of feature vectors 300 for an example set of three requests. Each column of the set of feature vectors 300 represents a request 240 of the set of requests (e.g., Request 1, Request 2, and Request 3) that has been transformed into a feature vector indicating values for each of the features 250. For example, Request 1 includes the RCE keyword ".exe" as well as a 4-gram "// . . . " and was generated using python, while Request 2 includes the 4-gram /\*\*/ and was generated using python.

For each of the feature vectors, the attack probability generation component 210 may analyze the feature vector and may generate an attack probability for the corresponding request 240, and may decompose the attack probability into feature contribution data 256, as shown in FIG. 3B. FIG. 3B illustrates a set 350 of example feature contribution data 256 corresponding to the feature vectors 300 illustrated in FIG. 3A. As can be seen in FIG. 3B, each column represents the features 250 of a request 240 (e.g., Requests 1-3) and indicates the respective feature contribution for each feature 250 to the attack probability. As shown, most features 250 will have a zero feature contribution, and the sum of each column may contribute to the attack probability. In some embodiments, the request 240 may be classified as having a high attack probability if the attack probability exceeds a defined threshold (e.g., above 0.6).

Referring back to FIG. 2, and as discussed previously herein, the attack probability generated by the attack probability generation component 210 may be based on a number of features 250. It may be difficult to present the contribution data 256 in a meaningful way that can be utilized by a system administrator.

Pursuant to some embodiments of the present disclosure, a contribution generation component 220 may provide an additional categorization of the request 240 based on feature groups 252.

Feature groups 252 may represent a grouping of features 250. For example, each feature group 252 may include a plurality of features 250. The use of feature groups 252 may allow for more general grouping of the feature into a smaller number of categories that are easier to understand and/or manipulate by users and/or system administrators.

For example, the feature groups 252 may include, but are not limited to, a suspicious character feature group, a client classification feature group, an IP feature group, an RCE feature group, and/or an anomalies group.

The suspicious character feature group may include those features 250 that are related to the presence of special characters within the request 240. For example, features 250 such as types, positions, and/or content of characters included in the request 240 may be grouped in the suspicious character feature group.

The client classification feature group may include those features 250 related to the characterization of the client. For example, features 250 such as the detected client, a device fingerprint of the client, whether or not the client is malicious, is running JAVASCRIPT® and/or provided cookie challenge results, etc. may be grouped in the client classification feature group.

The IP feature group may include those features 250 related to the IP address associated with the request 240. For example, features 250 such as an IP risk score (a number between 0 and 1), whether the client IP is included in one or more malicious IP lists, such as a list of TOR or anonymous proxy IPs, or not, etc. may be grouped in the IP feature group.

The RCE feature group may include those features 250 related to the payload associated with the request 240. For example, features 250 related to a remote execution attack, such as RCE keywords and n-grams, etc. may be grouped in the RCE feature group.

The anomalies feature group may include those features 250 related to non-standard or otherwise suspicious aspects of the request 240. For example, features 250 related to a length of a URL of the request 240, the number of parameters within the request 240, etc. may be grouped in the anomalies feature group.

The feature groups 252 described herein are merely examples, and are not intended to limit the scope of the present disclosure. Other and/or additional types of feature groups 252 may be used. In some embodiments, the feature groups 252 may depend on the type of attack being analyzed. For example, a first type of attack (e.g., a denial of service type of attack) may be associated with a first set of feature groups 252, while a second type of attack (e.g., an RCE type of attack) may be associated with a second set of feature groups 252, different from the first set of feature groups 252. Features 250 associated with a first feature group 252 for a first type of attack may be associated with a second feature group 252 for a second type of attack. The feature groups 252 may be dynamic, and the constituent features 250 of the feature groups 252 may change over time. In some embodiments, the feature groups 252 for a set of features 250 may be automatically determined. In some embodiments, the features 250 of the feature groups 252 may be subject to creation or editing by a system administrator.

One way to use the feature groups 252 is as part of attack reporting. As described herein, a given request 240 may be identified as an attack based on a plurality of features 250. When reporting this attack, it may be difficult to represent the basis for identifying the request 240 as an attack. The use of feature groups 252 may make this task easier, by providing a smaller grouping of meaningful topics to which the various elements of contribution data 256 may be assigned.

For example, a contribution generation component 220 of the WAF 125 may generate contribution data 256 for each feature group 252 associated with one or more of the identified attacks. In some embodiments, the contribution data 256 (e.g., a feature group contribution) for a particular feature group 252 may be the sum of the contribution data 256 for each of the component features 250 of the feature group 252. For example, if a given feature group 252 contains three component features 250 such as Feature A with a feature contribution of 0.1, Feature B with a feature contribution of 0.2, Feature C with a feature contribution of 0.4, then the feature group contribution would be 0.7 in some embodiments.

Figure 4A:
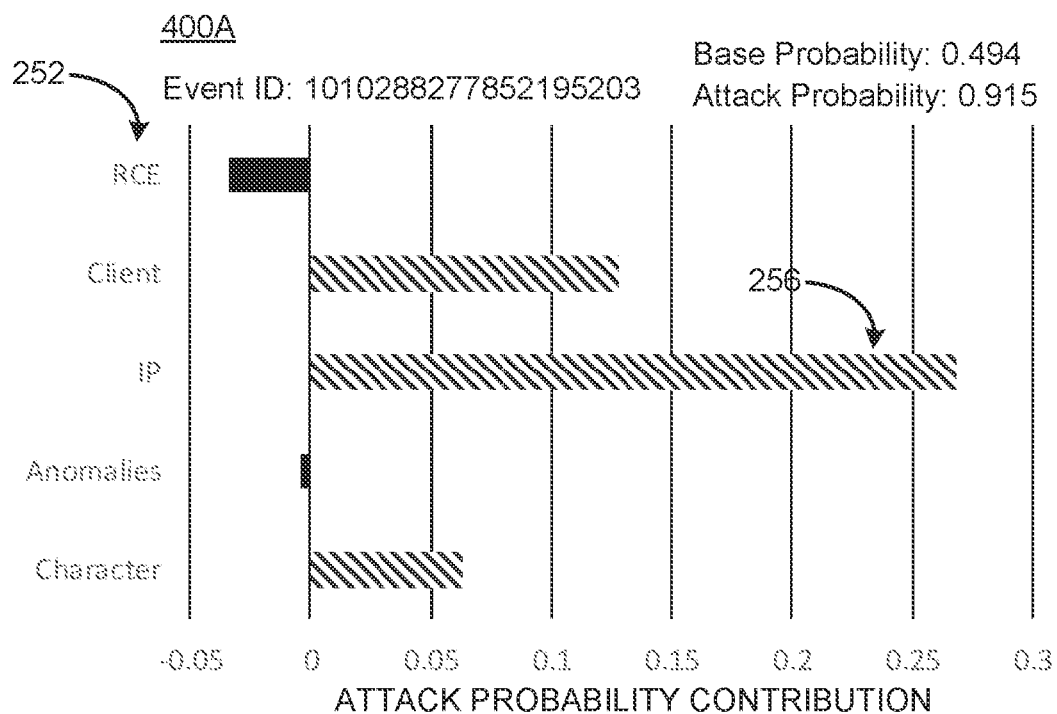
FIGS. 4A and 4B are examples of user interfaces that incorporate feature groups for analyzing WAF incidents, in accordance with some embodiments of the present disclosure.

Embodiments of the present disclosure may thus provide a mechanism for explaining the attack probability for an attack, a group of attacks, and/or any group of communication requests (e.g., HTTP requests to a web site). The WAF 125 may execute operations including, as described herein: calculating the contribution of each request feature 250 to an attack probability of a request 240 (in some embodiments, the contribution may be a number between −1 and 1); grouping the features 250 into a finite (e.g., less than 10 in some embodiments) number of logical and meaningful feature groups 252; and calculating the contribution of each feature group 252 to the attack probability. Each feature group 252 can add or reduce the attack probability In some embodiments, a graphical display can generate an analysis of a particular attack along with the relative contributions from each of a plurality of feature groups 252. FIG. 4A illustrates an example user interface, such as a user interface 400A provided on a graphical display communicatively coupled to the WAF 125, of a particular attack. Referring to FIG. 4A, an example user interface 400A illustrates the contributions to the attack probability for each of five example feature groups 252. For example, user interface 400A may provide a graph or other user interface element showing each of the feature groups 252 and their relative contribution. In FIG. 4A, the anomalies feature group ("Anomalies") is illustrated providing −0.004 to the attack probability, the RCE feature group ("RCE") is illustrated providing −0.034 to the attack probability, the IP feature group ("IP") is illustrated providing 0.268 to the attack probability, the client classification feature group ("Client") is illustrated providing 0.128 to the attack probability, and the suspicious character feature group ("Character") is illustrated providing −0.063 to the attack probability. Combined with a base probability of the attack of 0.494, an attack probability of 0.915 (a relatively high attack probability) can be determined as the base probability (which may be specific to the type of attack) plus the sum of the contributions of each of the feature groups 252. As discussed herein, the contributions of each of the feature groups 252 are based on the individual contributions of the features 250 that make up the feature groups 252.

In FIG. 4A, the attack probability that is illustrated by user interface 400A may be individual to a particular attack type (e.g., SQL injection, cross-site scripting, etc.). In some embodiments, the features 250 and the feature groups 252 will be relevant to the attack type (e.g., different attack types may have different feature groups 252).

In some embodiments, the user interface 400A may allow for each of the feature groups 252 to be drilled down to its composing features 250. For example, selecting, within the user interface 400A, the "IP" feature group may generate a user interface indicating that an IP address of 1.1.1.1 of the request 240 had a risk score of 0.78 that added +0.12 to the attack probability and the IP address exists in remote code execution black list that added +0.14 to the attack probability. As an additional example, selecting, within the user interface 400A, the "Client" feature group may illustrate aspects of the client of the request 240 that is relevant to the determination of the attack probability.

As illustrated in FIG. 4A, the use of feature groups 252 provides a powerful analysis tool. For example, a review of the attack illustrated in FIG. 4A illustrates that primary components that help drive the determination that the request was an attack included features 250 associated with the "Client" feature group (e.g., client characteristics) and the "IP" feature group (e.g., suspicious IP addresses). This information may have been lost if attempting to analyze the large number of underlying features 250 without the use of the feature groups 252. Moreover, the use of the feature groups 252 allows for deeper analysis into the types of attack vectors that are being experienced by the WAF 125. The information provided by the feature groups 252 may be useful in determining (and potentially customizing) aspects of the WAF 125 that are associated with aspects of the local computing environment that may be causing false positives, as will be discussed in further detail herein.

Figure 4B:
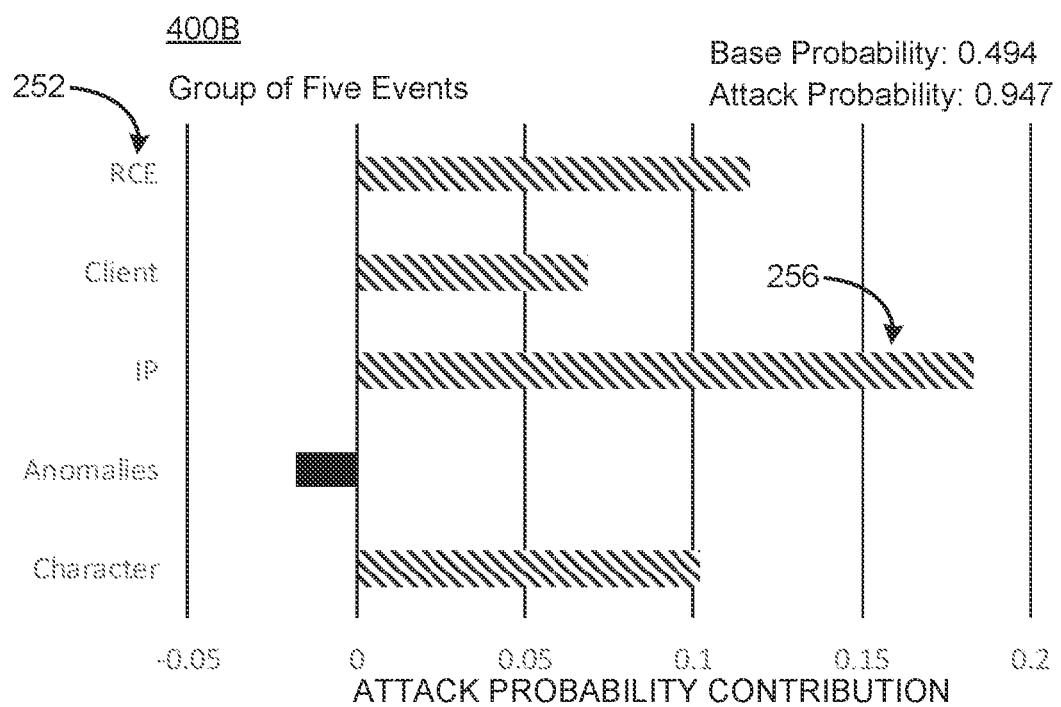

Though FIG. 4A illustrates an analysis based on features groups 252 for a single attack, the embodiments of the present disclosure are not limited thereto. In some embodiments, a user interface 400B may be provided that analyzes an attack probability associated with a plurality of attacks, as illustrated in FIG. 4B. Referring to FIG. 4B, groups of multiple events (five are illustrated in FIG. 4B) can be combined to show a group view in which feature groups 252 can be helpful in providing analysis. Referring to FIG. 4B, for the group of five events, the anomalies feature group ("Anomalies") is illustrated providing −0.018 to the attack probability, the RCE feature group ("RCE") is illustrated providing 0.117 to the attack probability, the IP feature group ("IP") is illustrated providing 0.183 to the attack probability, the client classification feature group ("Client") is illustrated providing 0.069 to the attack probability, and the suspicious character feature group ("Character") is illustrated providing 0.102 to the attack probability. Combined with a base probability of the attack of 0.494, an attack probability of 0.915 (a relatively high attack probability) can be determined as the base probability (which may be specific to the type of attack) plus the sum of the contributions of each of the feature groups 252. In some embodiments, the contribution data 256 provided for each of the feature groups 252 may be an average value across all of the attack events in the set of events being analyzed (e.g., across all five events in the example illustrated in FIG. 4B).

The use of feature groups 252 may make it possible to view the attack probability explanation for a single attack, a chosen plurality of attacks, and/or an entire site. Thus, embodiments according to the present disclosure may help to understand the "decision making" process of the ML model used by the WAF 125. In addition, as will be discussed further herein, the use of the feature groups 252 according to some embodiments of the present disclosure may make it possible to create a local security configuration that represents more accurately the local influences for a given data center.

In some embodiments, the use of the feature groups 252 may allow for more convenient and flexible customization of the WAF 125. Referring back to FIG. 2, the WAF 125 may include a customization generation component 230. The customization generation component 230 may receive user input 260 and, responsive thereto, provide local customizations 235 that can alter the behavior of the WAF 125 to more accurately reflect the operating environment of the WAF 125. For example, according to some embodiments of the present disclosure, the local customizations 235 may be used to update a respective weight of the contributions of the feature groups 252 to the attack probability and to update the contributions of specific features 250 to the attack probability.

In some embodiments, the attack probability generation component 210 of the WAF 125 may utilize the local customizations 235 to alter the attack probability. For example, the attack probability generation component 210 may generate an attack probability that is altered based on the local customizations 235 to generate a customized attack probability.

In some embodiments, the customized attack probability may be generated based on weights associated with respective ones of the feature groups 252. For example, the attack probability may be represented by the following formula:

$$\text{Attack Probability} = \sum_{k=0}^{n} a P_k, \quad \text{(Equation 1)}$$

where n is the number of feature groups 252, a is a weight for a given feature group 252, and $P_k$ is an attack probability associated with the given feature group 252. In some embodiments, $P_k$ may be given by $P_k = \sum_{i=0}^{m}(P_b + c_i)$, where $P_b$ is a base probability that is a number between 0 and 1 that is coupled to the ML model of the WAF and may change after training a new model, and $c_i$ is a feature probability contribution for each of m features in the feature group. Both $P_b$ and $c_i$ may be an output of the feature contribution algorithm utilized by the WAF. The attack probability for a given feature group 252 may be based on the respective attack probabilities for each of the features 250 that make up the feature group 252. The calculation provided in Equation 1 is merely an example. In some embodiments, the attack probability may be based on additional elements beyond just the features 250 and/or feature groups 252.

By adjusting the particular weight for a given feature group 252, the overall attack probability can be adjusted. The ability to adjust the weight of a feature group 252 can be helpful in particular circumstances where details of a particular operating environment might call for changes to the way the attack probability is calculated. As an example, a site may have many critical vulnerability attacks with high "client" (e.g., from the client classification feature group) contributions. The weight associated with the "client" feature group in the attack probability may be raised to 1.2 (or 120%)—which means network communications associated with characteristics of malicious clients contribute more to the attack probability. As another example, false positive attacks may be detected and associated with requests that had a high "IP" (e.g., from the IP feature group) contribution. The weight associated with the "IP" feature group may be reduced to 0.85 (or 85%) to reduce its impact on the attack probability.

Figure 5A:
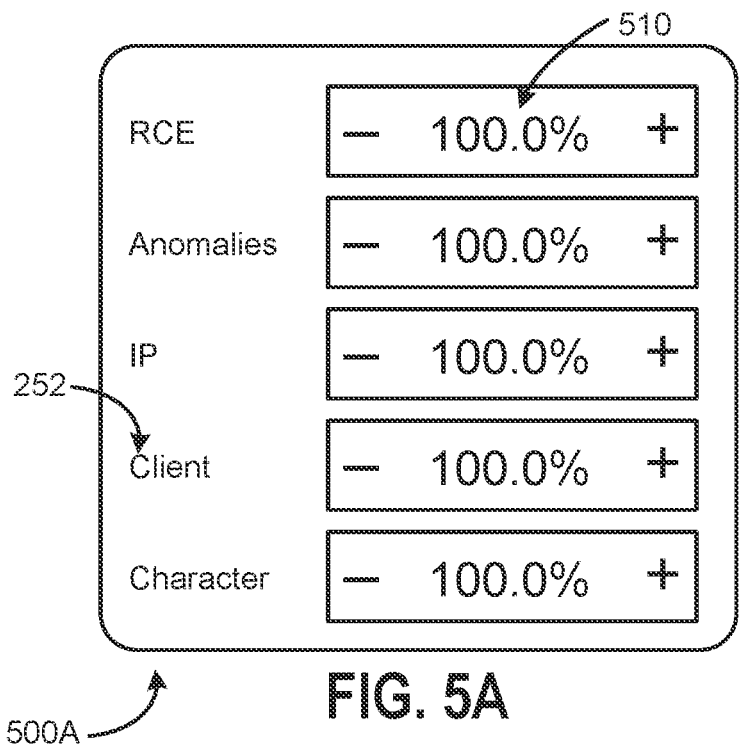
FIG. 5A is an example user interface for adjusting the weights of feature groups, in accordance with some embodiments of the present disclosure.

In some embodiments, the WAF 125 may provide a user interface that allows a user and/or administrator to adjust the weights. FIG. 5A is an example user interface 500A for adjusting the weights 510 of feature groups 252, in accordance with some embodiments of the present disclosure. As illustrated in FIG. 5A, the user interface 500A may provide a control to adjust each of the weights 510 associated with the feature groups 252. By adjusting (e.g., increasing or decreasing) the weight 510 utilizing the user interface 500A, the operation of the WAF 125 may be customized from a default behavior. For example, increasing the weight 510 for a given feature group 252 (e.g., the "RCE" feature group) may increase its relative weight in calculating an attack probability such that the features 250 making up the RCE feature group may be given greater weight in determining whether a request is an attack or not. Similarly, decreasing the weight 510 for a given feature group 252 (e.g., the "RCE" feature group) may decrease its relative weight in calculating an attack probability. The adjusted weights 510 may be used by the attack probability generation component 210 to determine the attack probability. For example, the weights 510 may be used to adjust the weight a of Equation 1, above, for a particular feature group 252.

The user interface 500A is merely an example. It will be understood by those of ordinary skill in the art that additional and/or different user interfaces could be provided for adjusting the weights 510 of the feature groups 252 without deviating from the scope of the present disclosure. In some embodiments, the adjustment of the weights 510 may be limited. That is to say that a given weight 510 may be constrained such that it cannot be lowered below a certain value or raised above a certain value. In some embodiments, the adjustment may only be allowed to be reduced, or only be allowed to be increased.

Referring again to FIG. 2, the customization generation component 230 of the WAF 125 may also be able to customize the individual contributions of the features 250. In some embodiments, the customization generation component 230 may access the log 254 of network communications analyzed by the WAF 125. In some embodiments, individual elements of the log 254 may be presented in a user interface for customization by way of user input 260.

Figure 5B:
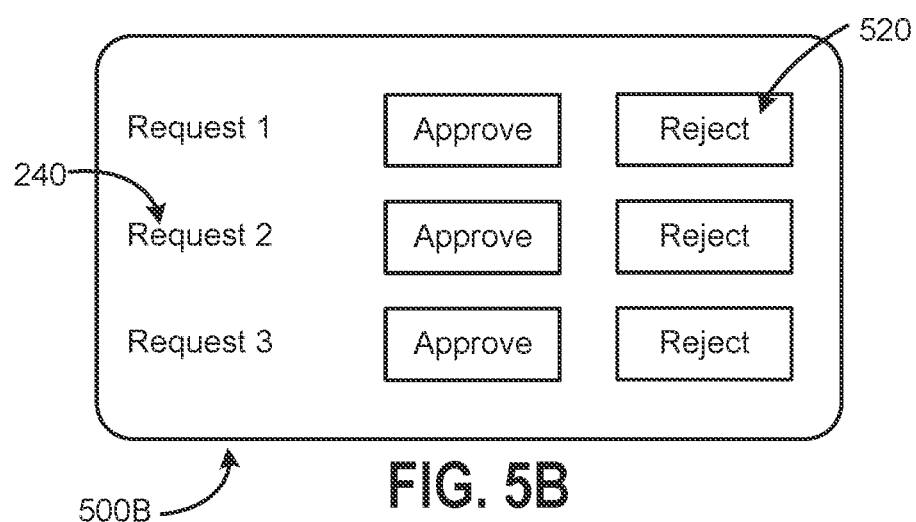
FIG. 5B is an example user interface for providing user input for individual network communications processed by the WAF, in accordance with some embodiments of the present disclosure.

FIG. 5B is an example user interface 500B for providing user input 260 for individual network communications processed by the WAF 125, in accordance with some embodiments of the present disclosure. As illustrated in FIG. 5B, the user interface 500B may list a plurality of prior requests 240 processed by the WAF 125. The requests 240 may include both network communications that were identified as attacks as well as those that were indicated as safe. The user interface 500B may include controls 520 that allow for user input 260 to accept or reject the characterization of the WAF 125. For example, the user interface 500B may allow for a user to characterize an attack as a false positive (e.g., the network communication was not an attack), or to characterize a request deemed safe as a false negative (e.g., the network communication was actually an attack).

The user input 260 can be used in a number of ways. For example, if the user repeatedly reports a false positive/false negative on predictions that have a common feature 250, that feature contribution can be updated in future predictions. For example, if there are many alerts reported by the user as false positive and they all have an IP address 1.1.1.1, future predictions from that IP address may remove the IP-related feature. This adjustment may be placed in a set of local customizations 235 (see FIG. 2) and used by the attack probability generation component 210 and/or the contribution generation component 220 in predicting the attack probability and/or feature group contribution. In some embodiments, modifications in the local customization 235 may be temporary and may expire after a certain amount of time passes.

In some embodiments, the user input 260 from a plurality of users may be collected. If there are many repeated similar reports, the local customizations 235 of each of the users may be fed back into the general ML model of the WAF so it can be improved. Thus, in some embodiments, the local customizations 235 based on the user input 260 may become a more permanent part of the ML mode.

In some embodiments, the user input 260 can be collected and values associated with the user input 260 aggregated. The result of the aggregations may represent how many times an alert value was found as false positive or a false negative by the user. An example aggregation is illustrated in the following table:

| Feedback type | Value type | value | counter |
| --- | --- | --- | --- |
| False positive | IP | 1.1.1.1 | 253 |
| False Negative | Keyword | 'cmd' | 120 |
| False Negative | client | 'Scary_ddos_tool" | 45 |

The first row of aggregated values of the table indicates that the IP 1.1.1.1 was encountered in 253 events that were marked as false positive by the user. The second row of aggregated values indicates the keyword 'cmd' was found in 120 false negative events. The third row of aggregated values indicates that attacks from a particular client 'Scary_ddos_tool' were missed as attacks (false negative) 45 times. In some embodiments, each record can be transformed to a local customization 235 by the customization generation component 230. For example, the local customization 235 may decrease a contribution of a feature 250 and/or feature group 252 that is associated with a large number of false positives. Similarly, the local customization 235 may increase a contribution of a feature 250 and/or feature group 252 that is associated with a large number of false negatives. In some embodiments, the generation of the local customization 235 may be performed responsive to the number of false positives/false negatives reaching a threshold value. In some embodiments, the decreasing and/or increasing contribution function may not be allowed to exceed beyond a particular adjustment.

The local customization 235 based on the false positives/false negatives can be applied locally (e.g., a short term change). If many users report the same types of adjustments, the adjustments can also be applied globally. When an adjustment is applied globally, it can also be used to fix the ML WAF data labels and fed back to retrain the ML model.

Figure 6:
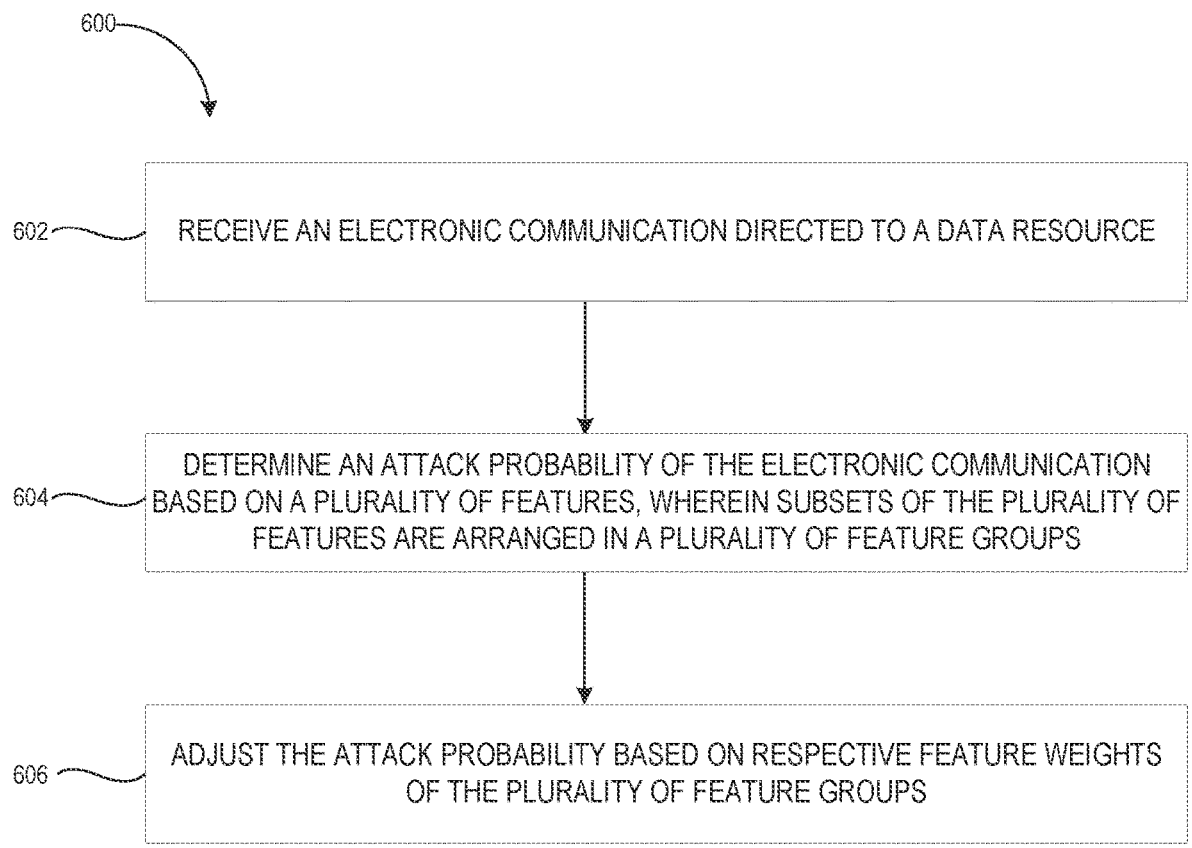
FIG. 6 is a flow diagram of a method for categorizing received requests into feature groups, in accordance with some embodiments of the present disclosure.

FIG. 6 is a flow diagram of a method 600 for categorizing received requests into feature groups, in accordance with some embodiments of the present disclosure. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 600 may be performed by a computer server or other computing device (e.g., security server 120 or data/security server 120' (via processing device 120A) illustrated in FIGS. 1A and 1B).

At block 602, the processing device 120A may receive an electronic communication directed to a data resource. For example, referring to FIGS. 1A, 1B, and 2, an electronic communication in the form of a request 240 may be received at the WAF 125. The request 240 may be from a computing device 110 received over network 140. In some embodiments, the request 240 may be generated by application 116 that is executing on computing device 110. The request 240 may be directed to a data server (e.g., data server 130 of FIG. 1A or data/security server 120' of FIG. 1B) within a data center 150.

At block 604, the processing device 120A may determine an attack probability of the electronic communication based on a plurality of features 250. Subsets of the plurality of features 250 may be arranged in a plurality of feature groups 252. As discussed herein with respect to FIGS. 2, 3A, and 3B, an attack probability generation component 210 may determine a plurality of feature vectors associated with the request 240 and may determine a contribution of each of the features 250 to an attack probability for the request 240. The features 250 may be grouped into a plurality of feature groups 252. The respective contributions of the features 250 of a feature group 252 may be used to determine a contribution of a given feature group 252 to the attack probability. For example, the contribution of each of the features 250 of the feature group 252 may be summed to determine the contribution of the feature group 252, though the embodiments of the present disclosure are not limited to this method of determining the feature group contribution.

Each of the feature groups 252 may contain one or more features 250. Different feature groups 252 may be utilized for different types of attacks. Thus, a particular feature 250 may be in one feature group 252 for a first type of attack, but may be in a different feature group 252 for a second type of attack. Similarly, different types, numbers, or arrangements of feature groups 252 may be used for different types of attacks. Examples of feature groups 252 include, but are not limited to, a suspicious character feature group, a client classification feature group, an IP feature group, an RCE feature group, and/or an anomalies group.

At block 606, the processing device 120A may adjust the attack probability based on respective feature weights of the plurality of feature groups 252. For example, as discussed herein with respect to FIGS. 2, 5A, and 5B, weights may be assigned to each of the plurality of feature groups 252. The weights may in some embodiments, be modified by user input 260. In some embodiments, the user input may indicate that a particular feature group 252 should be given a higher or lower weight in calculating attack probability. The weight associated with the feature groups 252 may be applied to the contribution of the feature group 252 to the attack probability, and the contribution of the feature group 252 may be based on the respective contributions of the features 250 that make up the feature group 252.

In some embodiments, adjustments to the weights may be provided. For example, user input may be provided in the form of feedback on prior network communications. In response to this feedback, a weight associated with a feature 250 and/or a feature group 252 may be modified. For example, feedback may indicate that prior determinations by the WAF 125 have resulted in false positives and/or false negatives. As a result, a weight associated with a feature 250 and/or a feature group 252 may be increased or decreased to reflect the feedback.

In some embodiments, the processing device 120A may perform a mitigation action responsive to determining that the attack probability exceeds a threshold value. As discussed herein with respect to FIG. 2, if an attack probability for a given network communication threshold exceeds a particular value (e.g., 0.6) mitigation actions may be taken with respect to the network communication to offset the potential for attack. As non-limiting examples, the WAF 125 may terminate a session, temporarily block a source IP of a request 240, display a CAPTCHA prompt, or the like in responsive to a network communication that is deemed to be potentially hazardous.

Figure 7:
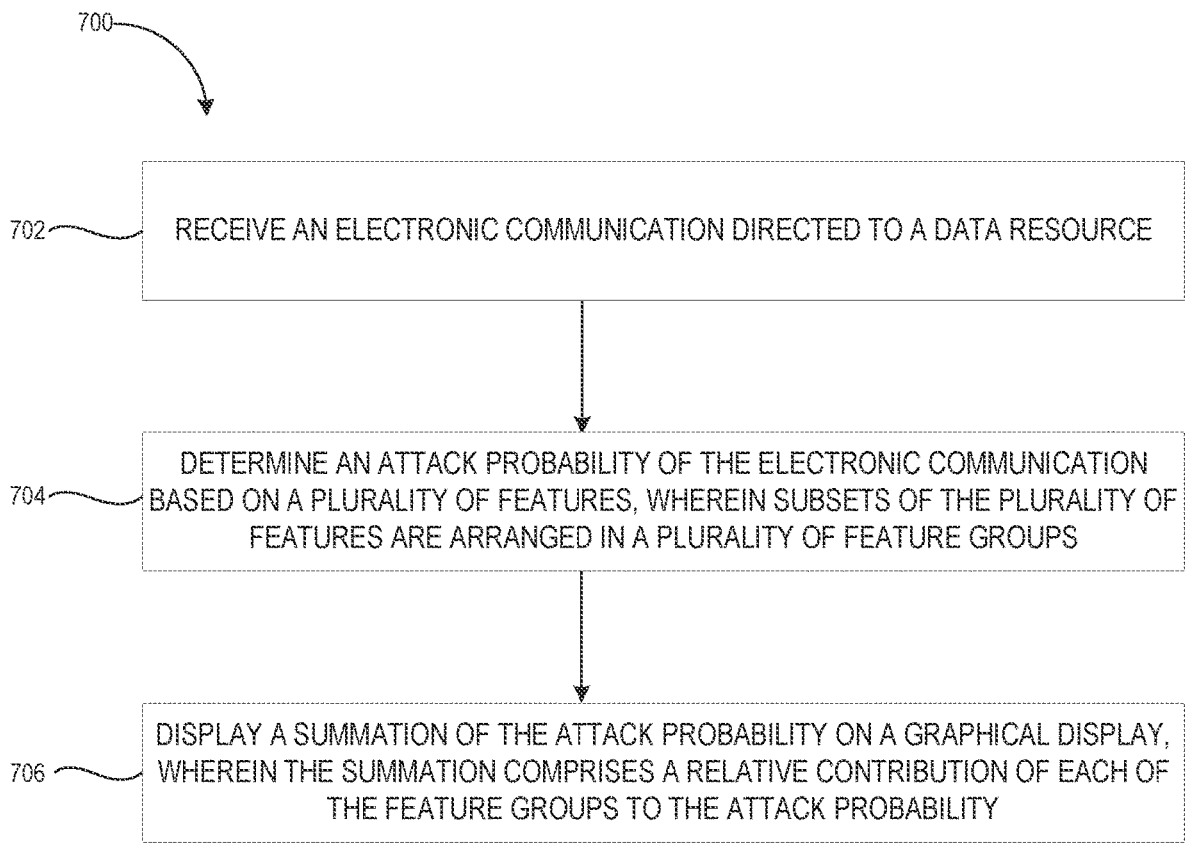
FIG. 7 is a flow diagram of a method for displaying attack probabilities in view of feature groups, in accordance with some embodiments of the present disclosure.

FIG. 7 is a flow diagram of a method 700 for displaying attack probabilities in view of feature groups, in accordance with some embodiments of the present disclosure. Method 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 600 may be performed by a computer server or other computing device (e.g., security server 120 or data/security server 120' (via processing device 120A) illustrated in FIGS. 1A and 1B).

At block 702, the processing device 120A may receive an electronic communication directed to a data resource. For example, referring to FIGS. 1A, 1B, and 2, an electronic communication in the form of a request 240 may be received at the WAF 125. The request 240 may be from a computing device 110 received over network 140. In some embodiments, the request 240 may be generated by application 116 that is executing on computing device 110. The request 240 may be directed to a data server (e.g., data server 130 of FIG. 1A or data/security server 120' of FIG. 1B) within a data center 150.

At block 704, the processing device 120A may determine an attack probability of the electronic communication based on a plurality of features 250. Subsets of the plurality of features 250 may be arranged in a plurality of feature groups 252. As discussed herein with respect to FIGS. 2, 3A, and 3B, an attack probability generation component 210 may determine a plurality of feature vectors associated with the request 240 and may determine a contribution of each of the features 250 to an attack probability for the request 240. The features 250 may be grouped into a plurality of feature groups 252. The respective contributions of the features 250 of a feature group 252 may be used to determine a contribution of a given feature group 252 to the attack probability. For example, the contribution of each of the features 250 of the feature group 252 may be summed to determine the contribution of the feature group 252, though the embodiments of the present disclosure are not limited to this method of determining the feature group contribution.

Each of the feature groups 252 may contain one or more features 250. Different feature groups 252 may be utilized for different types of attacks. Thus, a particular feature 250 may be in one feature group 252 for a first type of attack, but may be in a different feature group 252 for a second type of attack. Similarly, different types, numbers, or arrangements of feature groups 252 may be used for different types of attacks. Examples of feature groups 252 include, but are not limited to, a suspicious character feature group, a client classification feature group, an IP feature group, an RCE feature group, and/or an anomalies group.

At block 706, the processing device 120A may display a summation of the attack probability on a graphical display. The summation may include a relative contribution of each of the feature groups 252 to the attack probability. For example, as discussed herein with respect to FIGS. 2, 4A, and 4B, the summation may be provided by a graphical user interface (e.g., user interface 400A or 400B of FIGS. 4A and 4B). The summation may illustrate the contributions to the attack probability for each of the plurality of feature groups 252 for that type of attack. In some embodiments, the summation may be provided for a single attack, a chosen plurality of attacks, and/or an entire site. In some embodiments, the user interface may display the weights of the various feature groups 252 that were used in the calculation of the attack probability.

Figure 8:
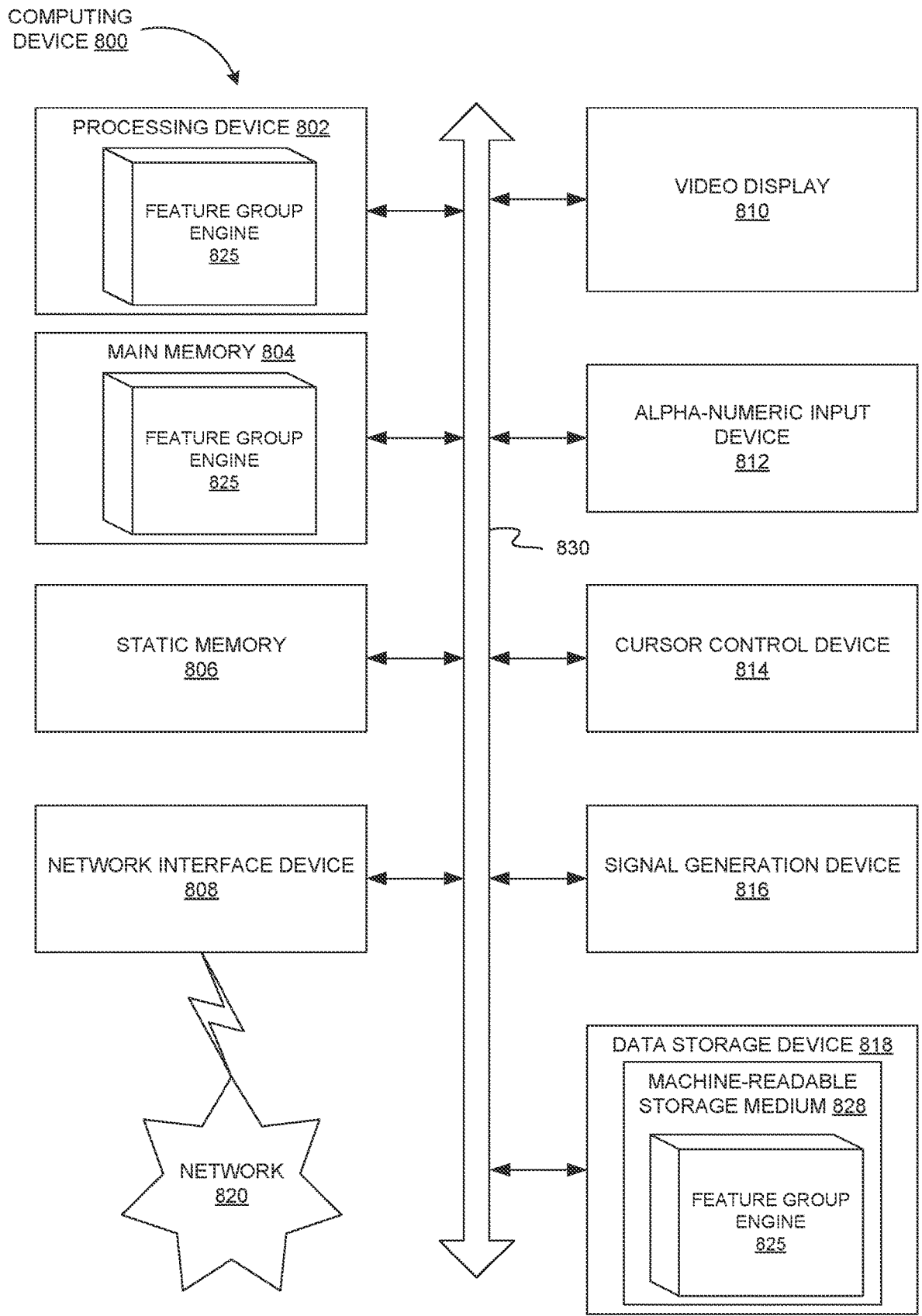
FIG. 8 is a block diagram of an example computing device that may perform one or more of the operations described herein, in accordance with some embodiments of the present disclosure.

FIG. 8 illustrates a diagrammatic representation of a machine in the example form of a computer system 800 within which a set of instructions, for causing the machine to perform any one or more of the methodologies discussed herein for grouping features of a network communications into feature groups.

In alternative embodiments, the machine may be connected (e.g., networked) to other machines in a local area network (LAN), an intranet, an extranet, or the internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 800 may be representative of a server. For example, data server 130 and security server 120 of FIG. 1A and/or data/security server 120' of FIG. 1B may be implemented as a computer system 800.

The example computer system 800 includes a processing device 802, a main memory 804 (e.g., read-only memory (ROM), dynamic random access memory (DRAM), a static memory 806 (e.g., flash memory, etc.), and a data storage device 818, which communicate with each other via a bus 830. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computer system 800 may further include a network interface device 808 which may communicate with a network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse) and an acoustic signal generation device 816 (e.g., a speaker). In one embodiment, video display unit 810, alphanumeric input device 812, and cursor control device 814 may be combined into a single component or device (e.g., an LCD touch screen).

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute instructions associated with feature group engine 825 for performing the operations and steps discussed herein.

The data storage device 818 may include a machine-readable storage medium 828, on which is stored one or more sets of instructions for feature group engine 825 (e.g., software) embodying any one or more of the methodologies of functions described herein. The feature group engine 825 may also reside, completely or at least partially, within the main memory 804 or within the processing device 802 during execution thereof by the computer system 800; the main memory 804 and the processing device 802 also constituting machine-readable storage media. The feature group engine 825 may further be transmitted or received over a network 820 via the network interface device 808.

The machine-readable storage medium 828 may also be used to store instructions to perform a method for categorizing network communications according to feature groups, as described herein. While the machine-readable storage medium 828 is shown in an example embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A method comprising:
   receiving an electronic communication directed to a data resource;
   determining, by a machine learning (ML) web application firewall (WAF), an attack probability of the electronic communication based on a plurality of features;
   determining a feature contribution to the attack probability for each of the plurality of features associated with the electronic communication, wherein
   the plurality of features are organized into a plurality of feature groups, and
   the attack probability is determined by combining a base probability and a sum of feature contributions of each of the plurality of feature groups that include the respective feature contribution of each of the plurality of features in the plurality of feature groups; and
   adjusting, by a processing device, the attack probability based on a respective feature weight of each of the plurality of feature groups.

2. The method of claim 1, further comprising performing a mitigation action responsive to determining that the attack probability exceeds a threshold value.

3. The method of claim 1, further comprising:
   receiving user input comprising feedback on the electronic communication; and
   modifying the feature weight of a feature group of the plurality of feature groups based on the user input.

4. The method of claim 3, further comprising modifying an ML model of the ML WAF based on the received user input.

5. The method of claim 1,
wherein determining the attack probability is performed based on the feature contribution of each of the plurality of features associated with the electronic communication.

6. The method of claim 1, further comprising displaying a summation of the attack probability on a graphical display, and
wherein the summation comprises a relative contribution of each of the feature groups to the attack probability.

7. The method of claim 6, wherein the electronic communication comprises a plurality of electronic communications,
wherein the attack probability is associated with the plurality of electronic communications, and
wherein the summation comprises the relative contribution of each of the feature groups to the attack probability that is associated with the plurality of electronic communications.

8. The method of claim 1, wherein the electronic communication is a first electronic communication of a first communication type and the plurality of feature groups is a first plurality of feature groups arranged from first subsets of the plurality of features, and
wherein the method further comprises:
receiving a second electronic communication of a second communication type that is directed to the data resource; and
determining an attack probability of the second electronic communication based on the plurality of features, wherein second subsets of the plurality of features are arranged in a second plurality of feature groups that is different from the first plurality of feature groups.

9. A system comprising:
a memory to store instructions associated with a machine learning (ML) web application firewall (WAF); and
a processing device operatively coupled to the memory, the processing device to:
receive an electronic communication directed to a data resource;
determine an attack probability of the electronic communication based on a plurality of features;
determine a feature contribution to the attack probability for each of the plurality of features associated with the electronic communication, wherein
the plurality of features are organized into a plurality of feature groups, and
the attack probability is determined by combining a base probability and a sum of feature contributions of each of the plurality of feature groups that include the respective feature contribution of each of the plurality of features in the plurality of feature groups; and
adjust the attack probability based on a respective feature weight of each of the plurality of feature groups.

10. The system of claim 9, wherein the processing device is further to:
receive user input comprising feedback on the electronic communication; and
modify the feature weight of a feature group of the plurality of feature groups based on the user input.

11. The system of claim 10, wherein the processing device is further to modify an ML model of the ML WAF based on the received user input.

12. The system of claim 9,
wherein determining the attack probability is performed based on the feature contribution of each of the plurality of features associated with the electronic communication.

13. The system of claim 9, wherein the processing device is further to display a summation of the attack probability on a graphical display, and
wherein the summation comprises a relative contribution of each of the feature groups to the attack probability.

14. The system of claim 13, wherein the electronic communication comprises a plurality of electronic communications,
wherein the attack probability is associated with the plurality of electronic communications, and
wherein the summation comprises the relative contribution of each of the feature groups to the attack probability that is associated with the plurality of electronic communications.

15. The system of claim 9, wherein the electronic communication is a first electronic communication of a first communication type and the plurality of feature groups is a first plurality of feature groups arranged from first subsets of the plurality of features, and
wherein the processing device is further to:
receive a second electronic communication of a second communication type that is directed to the data resource; and
determine an attack probability of the second electronic communication based on the plurality of features, wherein second subsets of the plurality of features are arranged in a second plurality of feature groups that is different from the first plurality of feature groups.

16. A non-transitory computer-readable medium having instructions stored thereon which, when executed by a processing device, cause the processing device to:
receive an electronic communication directed to a data resource;
determine, by a machine learning (ML) web application firewall (WAF), an attack probability of the electronic communication based on a plurality of features;
determining a feature contribution to the attack probability for each of the plurality of features associated with the electronic communication, wherein
plurality of features are organized into a plurality of feature groups, and
the attack probability is determined by combining a base probability and a sum of feature contributions of each of the plurality of feature groups that include the respective feature contribution of each of the plurality of features in the plurality of feature groups; and
adjust, by the processing device, the attack probability based on a respective feature weight of each of the plurality of feature groups.

17. The non-transitory computer-readable medium of claim 16, wherein the processing device is further to:
receive user input comprising feedback on the electronic communication; and
modify the feature weight of a feature group of the plurality of feature groups based on the user input.

18. The non-transitory computer-readable medium of claim 16, wherein the processing device is further to determine a feature contribution for each of the plurality of features associated with the electronic communication, and wherein determining the attack probability is performed based on the feature contribution of each of the plurality of features associated with the electronic communication.

19. The non-transitory computer-readable medium of claim 16, wherein the processing device is further to display a summation of the attack probability on a graphical display, and wherein the summation comprises a relative contribution of each of the feature groups to the attack probability.

20. The non-transitory computer-readable medium of claim 16, wherein the electronic communication is a first electronic communication of a first communication type and the plurality of feature groups is a first plurality of feature groups arranged from first subsets of the plurality of features, and wherein the processing device is further to:
receive a second electronic communication of a second communication type that is directed to the data resource; and
determine an attack probability of the second electronic communication based on the plurality of features, wherein second subsets of the plurality of features are arranged in a second plurality of feature groups that is different from the first plurality of feature groups.

* * * * *